United States Patent [19]
Dunlap et al.

[11] Patent Number: 5,748,695
[45] Date of Patent: May 5, 1998

[54] FUEL ASSEMBLY STRUCTURE SELECTIVELY USING CHANNEL AND COOLANT ROD FOR LOAD SUPPORT AND METHOD

[75] Inventors: Thomas G. Dunlap; Robert B. Elkins; Mark J. Colby, all of Wilmington, N.C.

[73] Assignee: General Electric Company, Schenectady, N.Y.

[21] Appl. No.: 551,769

[22] Filed: Nov. 7, 1995

[51] Int. Cl.$^6$ ............................................. G21C 3/322
[52] U.S. Cl. .................................. 376/446; 376/444
[58] Field of Search .................... 376/434, 444, 376/446, 448

[56] References Cited

U.S. PATENT DOCUMENTS

| | | |
|---|---|---|
| 3,015,616 | 1/1962 | Sturtz et al. . |
| 3,197,381 | 7/1965 | Blake . |
| 3,344,036 | 9/1967 | Haslam et al. . |
| 3,366,546 | 1/1968 | Anthony et al. . |
| 3,395,077 | 7/1968 | Long Sun Ton et al. . |
| 3,607,639 | 9/1971 | Hokasen et al. . |
| 3,697,376 | 10/1972 | Mefford et al. . |
| 3,992,259 | 11/1976 | Anthony et al. . |
| 4,038,137 | 7/1977 | Pugh . |
| 4,364,901 | 12/1982 | Feutrel . |
| 4,418,036 | 11/1983 | Gjertsen et al. . |
| 4,499,047 | 2/1985 | Borrman et al. . |
| 4,560,532 | 12/1985 | Barry et al. ........................ 376/444 |
| 4,578,241 | 3/1986 | Borrman et al. .................... 376/446 |
| 4,587,093 | 5/1986 | Borrman et al. . |
| 4,588,550 | 5/1986 | Blomstrand et al. . |
| 4,632,804 | 12/1986 | Wallander et al. .................. 376/444 |
| 4,652,426 | 3/1987 | Boyle et al. . |
| 4,666,664 | 5/1987 | Doshi . |
| 4,683,117 | 7/1987 | Carlson et al. . |
| 4,749,547 | 6/1988 | Blomstrand et al. . |
| 4,795,608 | 1/1989 | Nylund . |
| 4,895,697 | 1/1990 | Andersson et al. .................. 376/446 |
| 5,327,471 | 7/1994 | Meier et al. ........................ 376/444 |
| 5,339,342 | 8/1994 | Meier et al. ........................ 376/446 |
| 5,436,946 | 7/1995 | Curulla et al. ..................... 376/448 |
| 5,481,579 | 1/1996 | Johansson et al. ................. 376/446 |
| 5,610,961 | 3/1997 | Dunlap et al. ..................... 376/446 |
| 5,627,866 | 5/1997 | Dunlap et al. ..................... 376/446 |
| 5,646,973 | 7/1997 | Proebstle et al. .................. 376/446 |

FOREIGN PATENT DOCUMENTS

| | | |
|---|---|---|
| 0 099 323 | 1/1984 | European Pat. Off. . |
| 3533317 A1 | 3/1987 | Germany . |
| WO 96 03752 A | 2/1996 | WIPO . |

*Primary Examiner*—Daniel D. Wasil
*Attorney, Agent, or Firm*—Nixon & Vanderhye PC

[57] ABSTRACT

A latch pin assembly is configured to enable selective engagement with at least one of the fuel assembly channel and the coolant rod such that the fuel assembly channel and the coolant rod can be selectively utilized to support the fuel assembly load, thereby eliminating the need for fuel tie rods. The latch pin assembly includes a latch pin selectively engageable with the fuel assembly channel and the coolant rod, and an anchoring assembly cooperating with the latch pin, wherein the anchoring assembly anchors the latch pin in a selected position such that the latch pin engages at least one of the fuel assembly channel and the coolant rod. The latch pin may be alternatively engageable with the fuel assembly channel and the coolant rod or simultaneously engageable with the fuel assembly channel and the coolant rod. With this arrangement, the bail handle can be used both to remove the entire assembly including the fuel assembly channel from the reactor vessel or to remove only the fuel bundle from the reactor vessel, leaving the fuel assembly channel in place.

28 Claims, 11 Drawing Sheets

FUEL ASSEMBLY STRUCTURE SELECTIVELY USING CHANNEL AND COOLANT ROD FOR LOAD SUPPORT AND METHOD

TECHNICAL FIELD

This invention relates to the structure of a fuel assembly in a boiling water nuclear reactor vessel and, more particularly, to a fuel assembly structure that selectively utilizes the channel and the coolant rod to support its load, thereby eliminating the need for fuel tie rods.

BACKGROUND

A conventional fuel assembly in a boiling water nuclear reactor vessel includes a lower tie plate, an upper tie plate and a matrix of sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A channel surrounds the tie plates, fuel rods and coolant rod. This channel is commonly square in cross-section and made of metal (preferably an alloy called Zircaloy). Water passes from the bottom of the fuel assembly to the top of the fuel assembly. Water enters through the lower tie plate within the channel and passes between the upstanding fuel rods. Water and generated steam exit from within the channel between the fuel rods and out through the upper tie plate. The channel confines the required moderator coolant flow to a flow path that is restricted between the tie plates.

The lower tie plate and the upper tie plate serve to support the sealed fuel rods in the vertical and upstanding matrix. Typically, the upper tie plate forms an overlying matrix of fuel rod support points. Into about eight of these support points are conventionally placed correspondingly male threaded tie rods and fittings. The tie rods, which contain fuel similar to the fuel rods, are threaded at their lower ends for corresponding attachment to the lower tie plate. The lower tie plate similarly forms an underlying matrix of fuel rod support points. These underlying support points correspond for the most part to the overlying support points of the upper tie plate. Conventionally, about eight of these support points are threaded with female apertures, which correspond to the overlying apertures in the upper tie plates. Into these threaded support points in the lower tie plates are placed the lower threaded ends of the fuel tie rods. Thus, conventionally, the two tie plates are tied together with the fuel tie rods.

The tie plates also define a matrix of apertures for permitting fluid flow into and out of the fuel assembly. Specifically, the lower tie plate defines a first matrix of apertures for permitting the in flow of water coolant. This coolant functions in the capacity of moderating or slowing down reaction produced fast neutrons to produce reaction continuing slow or thermal neutrons. At the same time, as the coolant passes upwardly through the fuel assembly within the channel, a portion of the coolant is turned to steam. This steam and the coolant that is not turned into steam and remains in the liquid phase must pass out through the upper tie plate. Consequently, the upper tie plate forms its own matrix of apertures in between its matrix of fuel rod support points. The upper tie plate matrix of apertures permits the out flow of the two phase steam/water mixture from the fuel assembly.

The fuel bundle must be periodically replaced and/or inspected during so-called "outages" of a reactor. These outages occur when the central steam generating core of a nuclear reactor has its overlying component removed to provide access through shielding water to the core. During such "outages," sections of the reactor vessel core are removed, inspected and/or replaced. The core, submerged in a radiation quenching bath of water, has the fuel bundles to be replaced for inspection removed by remotely grasping the fuel assembly at a handle. The handle must define, at the top of the fuel assembly, a support point for the entire weight of the fuel assembly in a depending relationship when the assembly is removed from the vessel. Once the fuel assembly is supported at the handle, the entire weight of the fuel assembly is carried through the handle. This weight includes the weight of the fuel and coolant rods, the weight of the upper tie plate, the weight of the lower tie plate and the weight of the surrounding channel (upwards of 600 pounds).

Once the fuel assembly is removed from the vessel, the tie plates, fuel rods and coolant rods can be separated from the channel. After separation from the channel, the fuel rods can easily be inspected and/or replaced. Conventionally, however, the threaded end plugs of the fuel tie rods tend to seize in their threaded connections, thus making replacement of the fuel tie rods difficult and time consuming. Moreover, as fuel assembly design lifetimes are extended, corrosion effects weaken the fuel tie rods. This weakening occurs due to corrosion thinning of the material and by a reduction in ductility due to the formation of hydrogen and its absorption.

Thus, there is a need to provide a fuel assembly structure that does not include fuel tie rods threadedly connected between the upper and lower tie plates. Moreover, there is a need to utilize a structural load path for the fuel assembly that is less affected by corrosion effects. In general, since corrosion is a surface phenomena, a structure with a high volume to surface area provides more margin in this regard. Without adding additional structure to the general design of boiling water reactor fuel assemblies, the component with the highest volume to surface area is the channel. A fuel assembly that utilizes the channel to support its load is described in commonly owned copending application Ser. No. 08/542,382, filed on Oct. 12, 1995, now U.S. Pat. No. 5,627,866, the disclosure of which is herein incorporated by reference.

It would be advantageous to enable the selective use of the channel and the coolant rod to carry the fuel assembly load such that either the entire fuel assembly can be removed from the reactor vessel or only the fuel bundle (i.e., without the channel) can be removed from the reactor vessel.

DISCLOSURE OF THE INVENTION

It is therefore an object of the invention to provide a fuel assembly structure that enables selective use of the channel and the coolant rod as the structural member for carrying the fuel assembly load. Another object of the invention is to provide a fuel assembly structure that allows lifting of the assembly through a load path that does not utilize fuel tie rods. It is yet another object of the invention to provide a method of lifting the fuel bundle and the fuel assembly.

These and other objects of the invention are achieved by providing a latch pin assembly for a tie plate in a boiling water nuclear reactor including a fuel assembly channel surrounding a plurality of fuel rods and at least one coolant rod. The latch pin assembly includes a latch pin selectively engageable with the fuel assembly channel and the coolant rod; and an anchoring assembly cooperating with the latch pin. The anchoring assembly anchors the latch pin in a selected position such that the latch pin engages at least one of the fuel assembly channel and the coolant rod.

The latch pin may be alternatively engageable with the fuel assembly channel and the coolant rod or simultaneously engageable with the fuel assembly channel and the coolant rod. The tie plate preferably includes a latch pin channel, and the latch pin is movably disposed in the latch pin channel. The latch pin may be provided with a head delimiting an outer end of the latch pin channel, wherein the assembly further includes a spring disposed between the head and an inner end of the latch pin channel. In this embodiment, the spring urges the latch pin toward a position in engagement with the fuel assembly channel.

The anchoring assembly may be defined by at least one annular groove formed in the latch pin channel; and an anchoring pin extending through the head and radially outwardly from diametrically opposite sides of the head, wherein the anchoring pin is shaped to be received in the annular groove. In one arrangement, the anchoring assembly includes two annular grooves formed in the latch pin channel. One of the two annular grooves corresponds to a first latch pin position where the latch pin is engaged with the coolant rod, and the other of the two annular grooves corresponds to a second latch pin position where the latch pin is disengaged from the fuel assembly channel and from the coolant rod. The latch pin may be configured to be movable to a third latch pin position where the latch pin is engaged with the fuel assembly channel and where the anchoring pin is not received in either of the two annular grooves.

The anchoring assembly may alternatively be defined by a hook disposed at an end of the latch pin opposite from the head, wherein the hook is selectively engageable with the coolant rod. In this arrangement, the hook is disposed offset from the longitudinal axis of the latch pin. In addition, the latch pin may be rotatably disposed in the latch pin channel for rotation about the longitudinal axis between an engaged position where the hook is engaged with the coolant rod and a disengaged position where the hook is disengaged with the coolant rod. Still further, the latch pin may be extendible through an aperture through the inner end of the latch pin channel, wherein the hook is fixed to the end opposite from the head extended through the aperture. In this arrangement, the anchoring assembly additionally includes a stop surface, wherein in the disengaged position, the hook abuts the stop surface.

The latch pin may be provided with an inner shaft movably disposed in the latch pin channel and an outer shaft surrounding the inner shaft and movably disposed in the latch pin channel, wherein the inner shaft is movable relative to the outer shaft. In this arrangement, the anchoring assembly is defined by at least one annular groove formed in the latch pin channel; an aperture formed in the outer shaft; and an anchoring member disposed in the aperture and engageable with the annular groove and the inner shaft. The anchoring member may be a ball, and the anchoring assembly may include two annular grooves formed in the latch pin channel, wherein one of the two annular grooves corresponds to a first latch pin position where the latch pin is engaged with the coolant rod, and the other of the two annular grooves corresponds to a second latch pin position where the latch pin is engaged with the fuel assembly channel. The inner shaft may include an engaging shaft portion engageable with the coolant rod, a transition shaft portion and an inner shaft head. The inner shaft head has a first diameter section, a tapering diameter section and a second diameter section, smaller than the first diameter section, wherein the anchoring member engages the inner shaft at the tapering diameter section of the inner shaft head. The latch pin may further be provided with a locking ring secured to an inside end of the outer shaft and defining a shelf inside the outer shaft, wherein the latch pin assembly further includes a spring disposed between the shelf and the first diameter section of the inner shaft head that urges the latch pin toward a position in engagement with the fuel assembly channel. The outer shaft may include an outer shaft head engageable with the fuel assembly channel, having a first innermost diameter, a second intermediate diameter smaller than the first innermost diameter, and a third outermost diameter larger than the second intermediate diameter.

In accordance with another aspect of the invention, there is provided a fuel assembly including a plurality of fuel rods; at least one coolant rod; a fuel assembly channel surrounding the plurality of fuel rods and the coolant rod; an upper tie plate disposed inside the fuel assembly channel and laterally supporting the fuel rods and the coolant rod; and a latch pin assembly selectively engageable with the fuel assembly channel and the coolant rod.

The latch pin assembly may include a latch pin, and the coolant rod may include an engaging aperture configured to receive the latch pin. The latch pin assembly may be further provided with an anchoring assembly cooperating with the latch pin, which anchors the latch pin in a selected position such that the latch pin engages at least one of the fuel assembly channel and the coolant rod. The latch pin may be alternatively engageable with the fuel assembly channel and the coolant rod or simultaneously engageable with the fuel assembly channel and the coolant rod. The tie plate may include a latch pin channel, wherein the latch pin is movably disposed in the latch pin channel. The latch pin may be provided with a head delimiting an outer end of the latch pin channel, wherein the latch pin assembly additionally includes a spring disposed between the head and an inner end of the latch pin channel that urges the latch pin toward a position in engagement with the fuel assembly channel.

In accordance with yet another aspect of the invention there is provided a method of lifting a fuel assembly in a boiling water nuclear reactor. The method includes enabling the latch pin assembly to selectively engage the fuel assembly channel and the coolant rod; anchoring the latch pin in a selected position such that the latch pin engages at least one of the fuel assembly channel and the coolant rod; and lifting the fuel assembly through the upper tie plate.

BRIEF DESCRIPTION OF THE DRAWINGS

These and other aspects and advantages of the present invention will become apparent from the following detailed description of preferred embodiments when taken in conjunction with the accompanying drawings, in which.

BEST MODE FOR CARRYING OUT THE INVENTION

Figure 1:
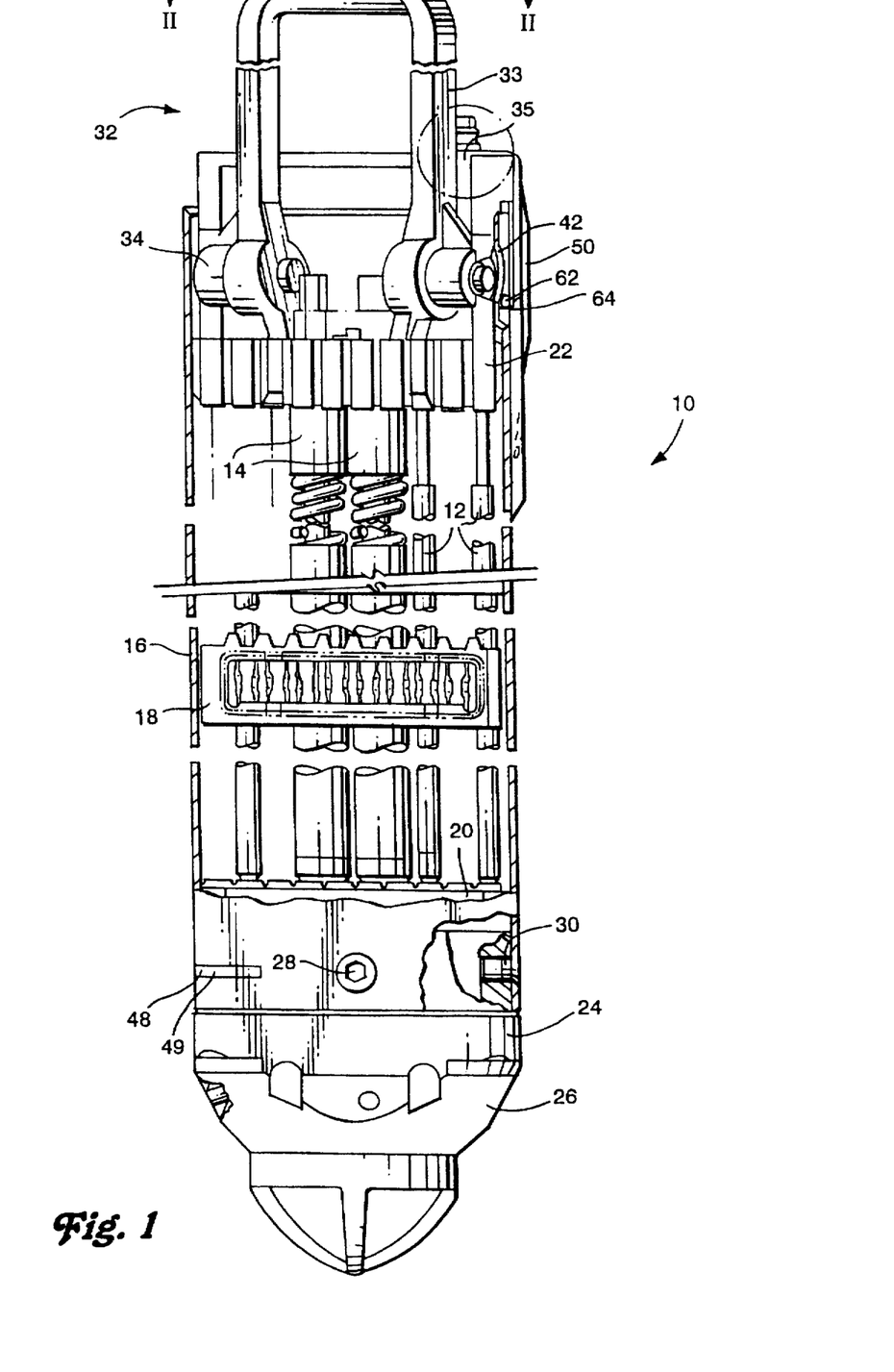
FIG. 1 is a cross-sectional view of a fuel assembly according to the invention.

FIG. 1 is a cross-section of a fuel assembly for a boiling water nuclear reactor in accordance with the present invention. The fuel assembly 10 includes a plurality of fuel rods 12, a pair of coolant rods 14 (two coolant rods 14 are illustrated and described in the preferred embodiment, however, a single coolant rod is often used in such fuel assemblies), and a channel 16 surrounding the fuel rods 12 and coolant rods 14. The fuel rods 12 are preferably arranged in a 10×10 matrix and are secured against lateral movement in the channel by a plurality of spacers 18. The coolant rods 14 are generally centrally disposed in the fuel rod matrix. Small holes are provided at both the lower and upper ends of the coolant rods 14 allowing water to be driven through the rod, thus introducing moderating material within the fuel rod matrix. One water rod also serves as the spacer-capture rod being mechanically locked to each of the spacers 18, thereby fixing the axial position of each spacer 18. The fuel rod spacers 18 are equipped with Inconel-X springs to maintain rod to rod spacing.

The fuel rods 12 and the coolant rods 14 are supported by a lower tie plate 20. An upper tie plate 22 receives the fuel rods 12 and the coolant rods 14 and restricts lateral movement. End plugs of the fuel rods have pins that fit into anchor holes in the tie plates 20, 22. An expansion space located over the top end plug of each fuel rod allows them to expand axially by sliding within the holes in the upper tie plate to accommodate differential axial thermal expansion. In contrast with the conventional structure, none of the fuel rods is threaded into the lower tie plate 20 or the upper tie plate 22. One or both of the coolant rods 14 may be securely threaded into the lower tie plate 20. As discussed above in connection with the prior art, it is not desirable to thread anything into the tie plates 20, 22 as the threads tend to seize over extended submersion times. In contrast with the fuel rods 12, however, the coolant rods 14 need not be removed from the bundle nearly as frequently as the fuel rods 12. Thus, in the present invention, the coolant rods 14 are threaded or otherwise securely attached to the lower tie plate 20.

A transition member 24 supports the lower tie plate 20 in the channel 16 and serves as a transition to the nose piece 26. The channel 16 is secured to the transition member 24 by any suitable structure. In the illustrated embodiment, a bolt 28 is threaded through the channel and into the transition member 24. Four bolts 28 are preferably threaded one each through each side of the substantially square cross-section of the channel 16. The transition member 24 has corresponding threaded bolt receiving holes 30 in each side of its corresponding square cross-section. The bolts 28 are preferably formed of alloy X-750.

Figure 2:
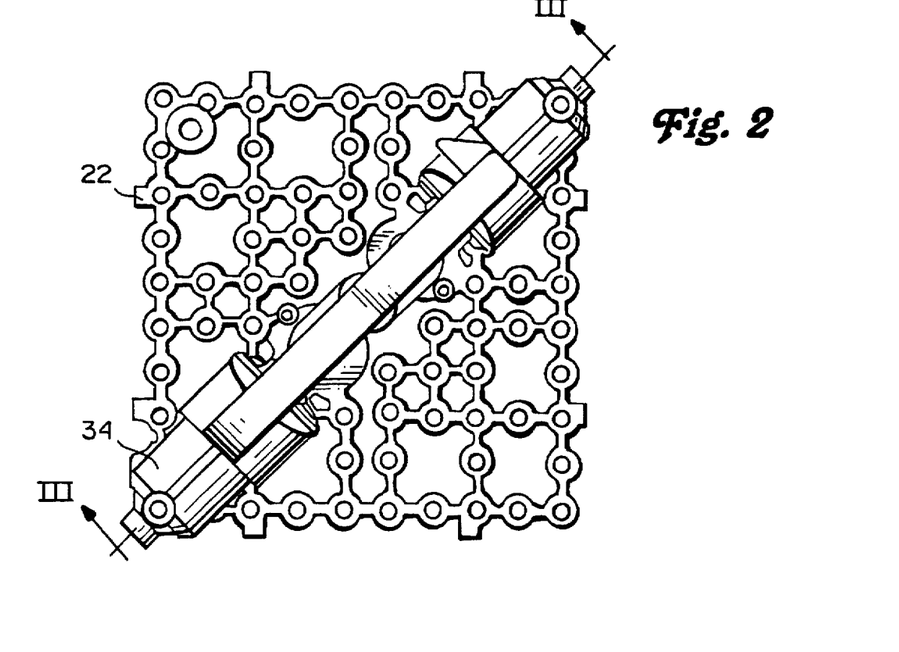
FIG. 2 is a view along line II—II in FIG. 1.
Figure 3:
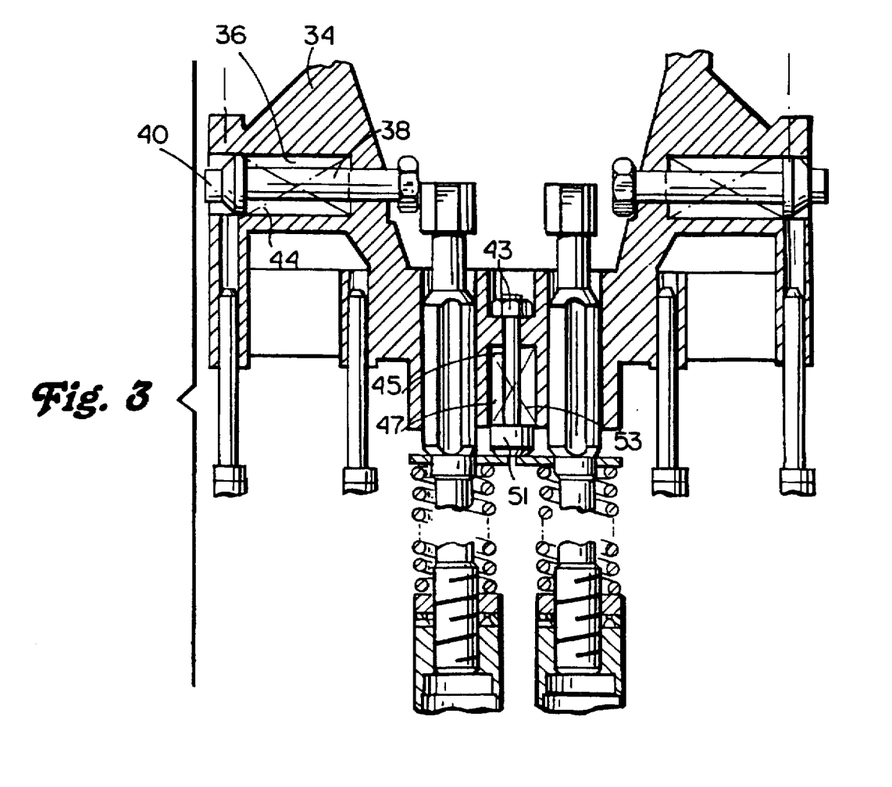
FIG. 3 is a cross-sectional view through line III—III in FIG. 2.

Integral with the upper tie plate 22 is a bail handle assembly 32. Referring to FIGS. 1 and 2, the bail handle assembly 32 includes a bail handle 33 and two boss members 34. FIG. 3 is a cross-section through line III—III in FIG. 2. The boss members 34 include a channel 36 formed therein. A latch pin 38 is movably disposed in the channel 36. A latch pin cap or head 40 is fixed to an outer end of the latch pin 38 and has a first outermost diameter that is configured to be extendible through a latch pin aperture 42 in the channel 16 and a second innermost diameter that is larger than the latch pin aperture 42 in the channel 16 and that serves as a stop surface for the latch pin 38. An inside surface of the latch pin cap 40 delimits the channel 36 in the boss members 34. A spring 44 is disposed around the latch pin 38 in the channel 36 between the inside surface of the latch pin cap 40 and an end of the channel 36. The spring 44 urges the latch pin 38 to an extended position, engaging the latch pin aperture 42 in the channel 16.

In operation, because the transition member 24 is rigidly secured to the channel 16 by means of the bolt 28 and because the latch pin 38 is inserted into the latch pin aperture 42 in the channel 16, when lifting the fuel assembly 10 with the bail handle assembly 32, the channel 16 bears the structural load of the fuel assembly 10. As noted above, the channel 16 has the highest volume to surface area of the components in the fuel assembly 10 and better avoids the effects of corrosion.

With continued reference to FIG. 3, a bolt 43 is disposed between the water rods 14 in an aperture 45 in the upper tie plate 22. The bolt 43 extends into a channel 47. A substantially cylindrical member 51 is fixed to the end of the bolt 43 and delimits the channel 47. A spring 53 is disposed surrounding the bolt 43 in the space delimited by the cylindrical member 51 and the top of the channel 47. The spring 53 serves to maintain the upper tie plate 22 spaced from the water rod main spring supports 55 as illustrated in FIG. 3. Moreover, the spring 53 urges the upper tie plate 22 upward such that the latch pins engage an upper end of the latch pin apertures 42. Still further, preload forces of the water rod main springs are diverted from the upper tie plate 22.

Figure 4:
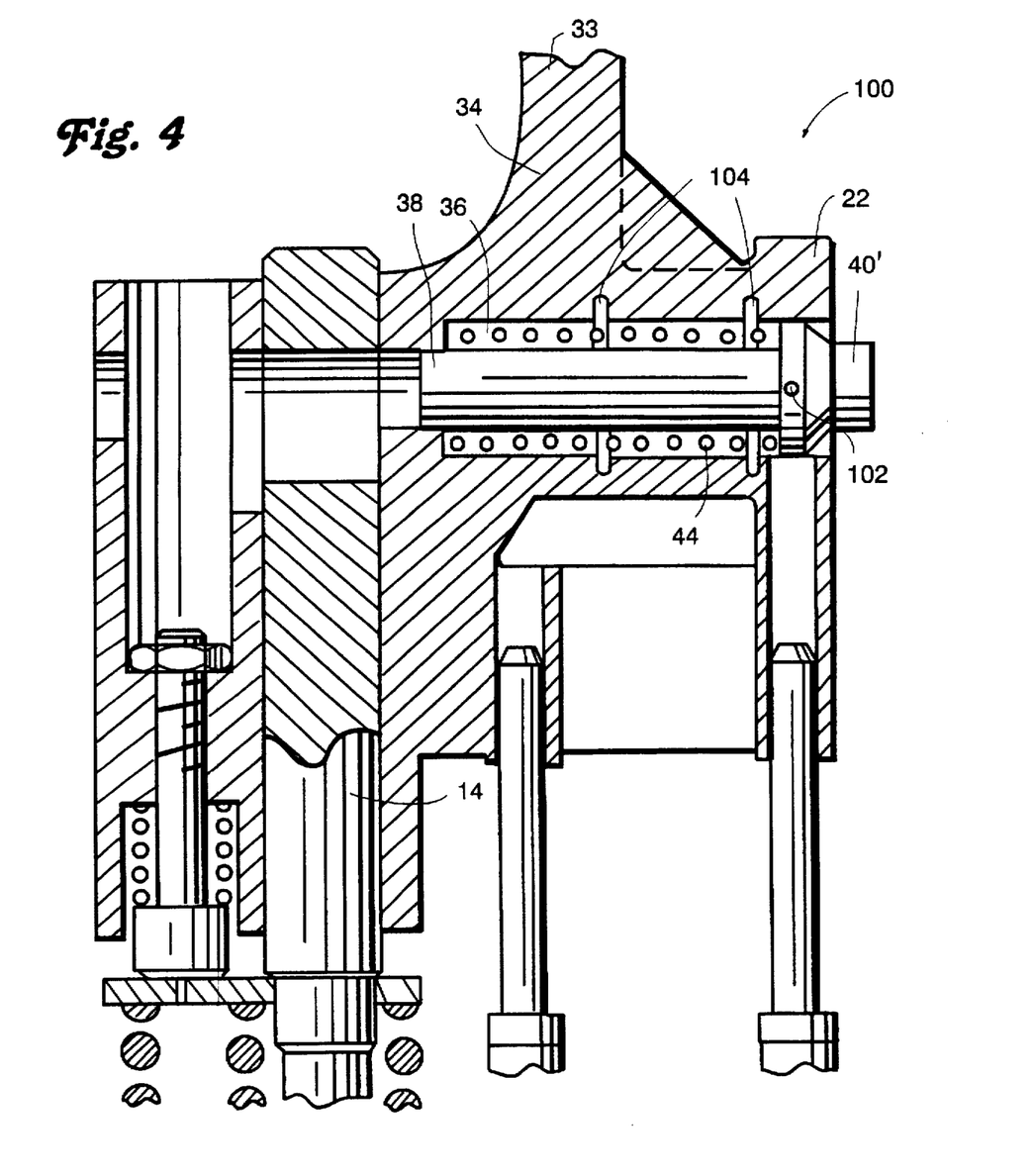
FIG. 4 illustrates a latch pin assembly according to the invention.

FIG. 4 illustrates a latch pin assembly 100 according to the invention. The latch pin assembly 100 enables selective attachment by the latch pin between the upper tie plate 22 and the channel 16 and between the upper tie plate 22 and the coolant rods 14. Referring to FIG. 4, the coolant rods 14 in this embodiment extend farther upward through the upper tie plate 22. Similar to the embodiment illustrated in FIG. 3, the latch pin 38 is movable in the channel 36 of the boss member 34, and a spring 44 surrounds the latch pin 38 urging the latch pin toward engagement with the channel. An end of the latch pin 38 extends through an aperture 108 in the upper tie plate 22.

The modified end cap or head 40' of the latch pin 38 includes an anchoring pin 102 extending through the head 40' and radially outwardly from diametrically opposite sides of the head 40'. The channel 36 includes two annular grooves 104 that are shaped to receive the anchoring pin 102.

Figure 5:
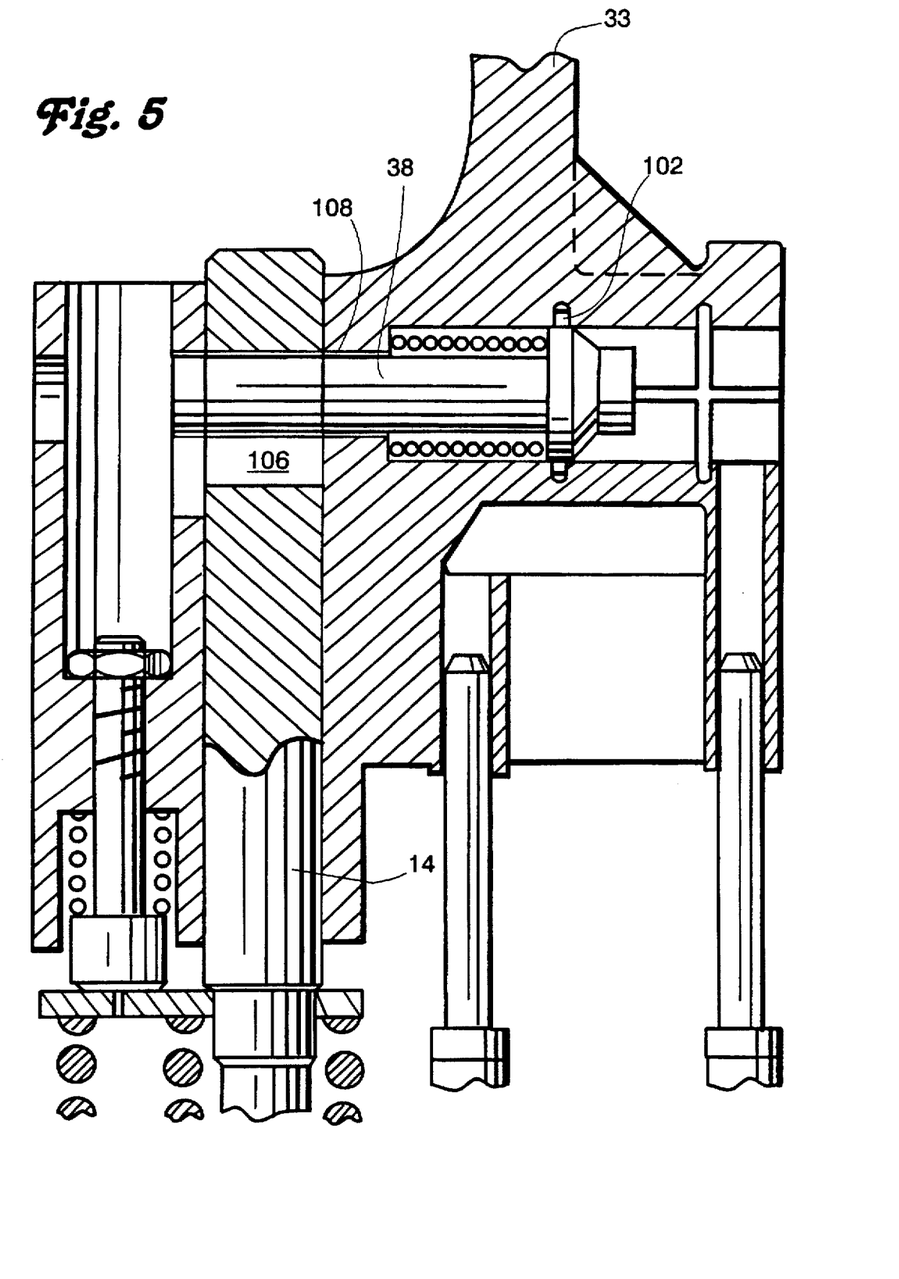
FIG. 5 illustrates the latch pin assembly engaging the coolant rod.

In the position shown in FIG. 4, the anchoring pin 102 is disengaged from the grooves 104 of the channel 36. Thus, the spring 44 urges the latch pin 38 to its outermost position in engagement with the channel. Referring to FIG. 5, when the latch pin 38 is driven inwardly, preferably by an external tool (not shown), the latch pin shaft extends through an aperture 106 in the coolant rod 14. When the anchoring pin 102 is aligned with the innermost of the two grooves 104, the external tool then rotates the latch pin 38 approximately 90° until the anchoring pin 102 is received in the groove. In this position, when lifting the fuel assembly by the bail handle 33, the fuel bundle can be removed from the vessel, and the channel will remain in place. The position illustrated in FIG. 5 is denoted as the first latch pin position.

Figure 6:
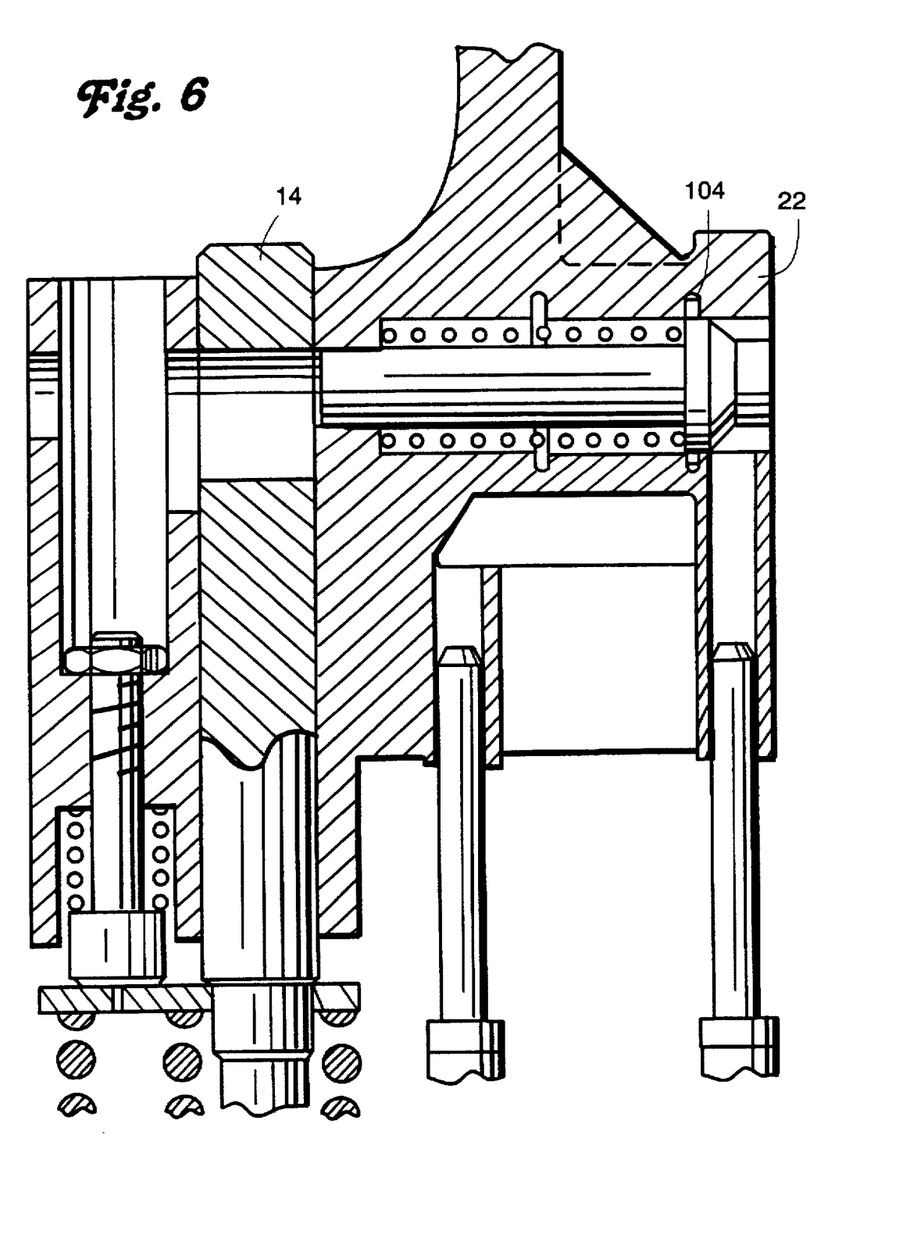
FIG. 6 illustrates the latch pin assembly in a neutral position.
Figure 7:
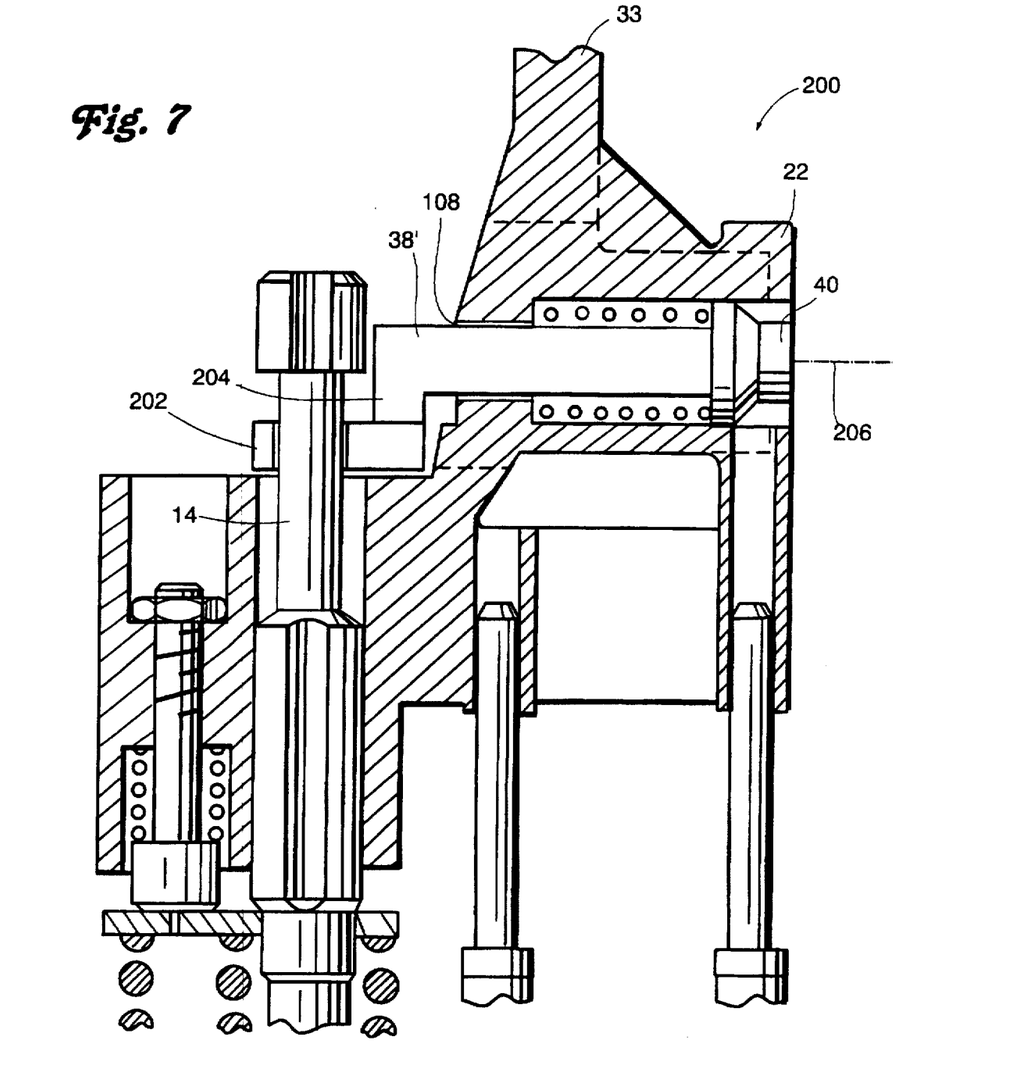
FIG. 7 illustrates an alternative latch pin assembly according to the invention.
Figure 8:
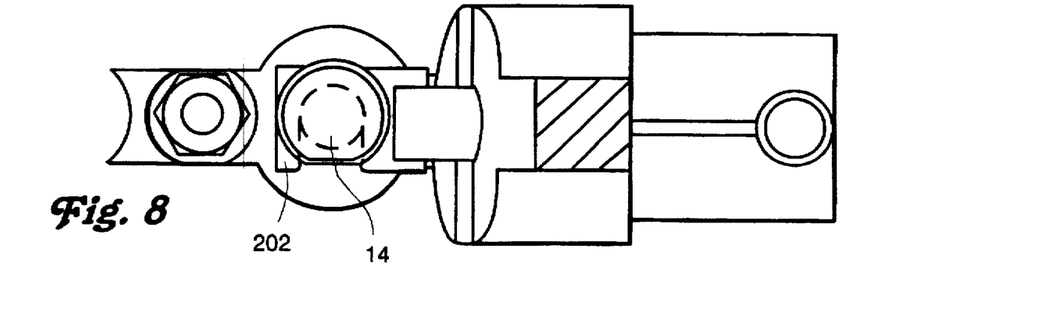
FIG. 8 is a top view of the latch pin assembly of FIG. 7.

FIG. 6 illustrates the second latch pin position, wherein the anchoring pin is engaged with a second of the grooves 104. At this position, the latch pin is neither engaged with the coolant rod 14 nor the channel 16, and the upper tie plate 20 can be removed from the assembly. In the position illustrated in FIG. 4, when the fuel assembly is lifted by the bail handle 33, the entire fuel assembly can be removed from the vessel.

FIGS. 7-10 illustrate an alternative latch pin assembly 200 according to the invention. In this arrangement, a modified latch pin 38' includes a hook member 202 secured to an end of the latch pin 38' that extends through the aperture 108 in the upper tie plate 22. An arm member 204 extends from the end of the latch pin 38', and the hook member 202 is secured to the end of the arm member 204 such that the hook member 202 is disposed offset from a longitudinal axis 206 of the latch pin 38'. As a result, the hook member 202 can be rotated into and out of engagement with the coolant rod 14. The latch pin 38' is rotated by an external tool (not shown).

Figure 9:
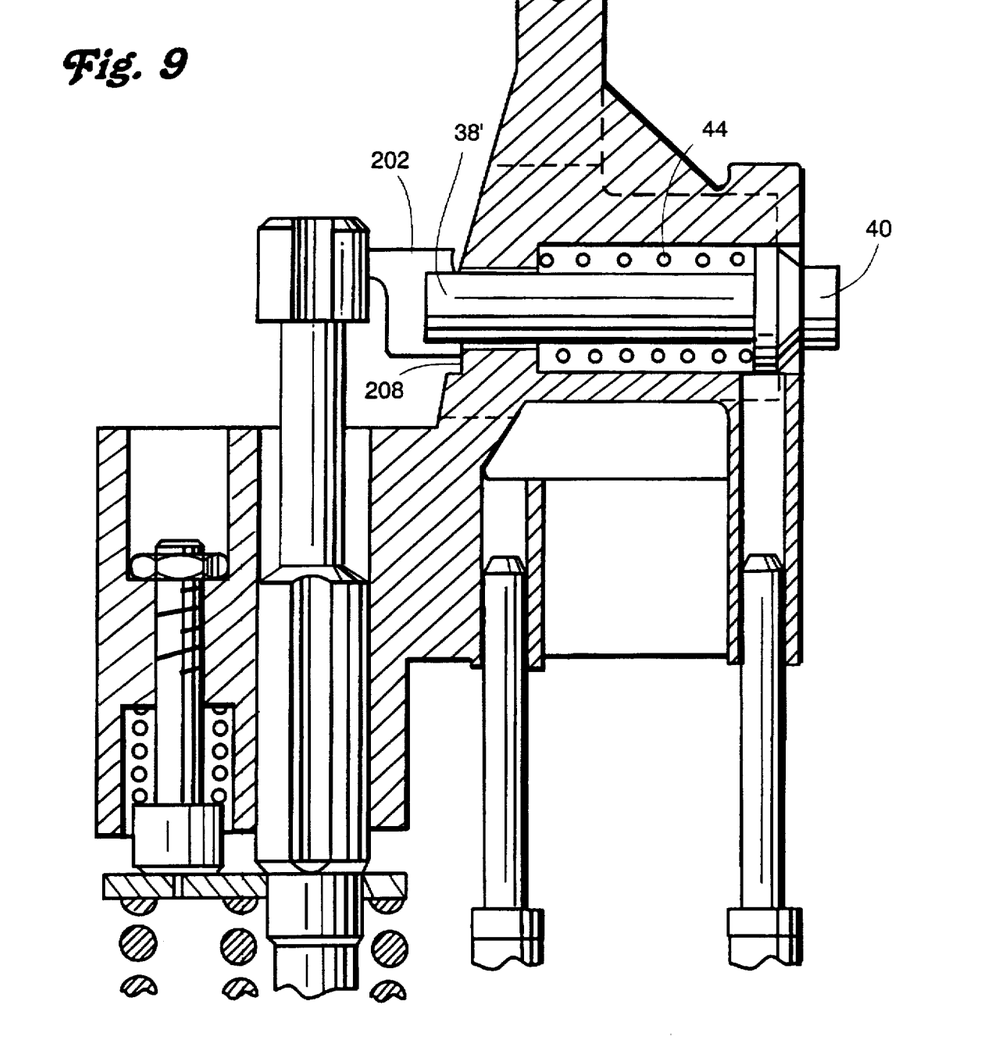
FIG. 9 illustrates the FIG. 7 latch pin assembly engaging the fuel assembly channel.
Figure 10:
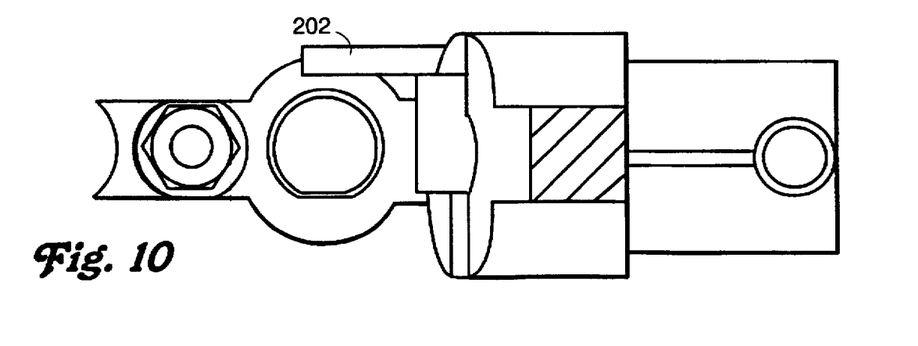
FIG. 10 is a top view of the latch pin assembly in FIG. 9.

In this configuration, when the hook member 202 is engaged with the coolant rod 14, the head 40 is maintained withdrawn from the channel. Thus, when the assembly is lifted by the bail handle 33, the fuel bundle can be removed from the reactor vessel without the channel 16. Referring to FIGS. 9 and 10, the hook member 202 is disengaged from the coolant rod 14 by rotating the latch pin with the external tool. When the hook member 202 is released from engagement, a spring 44 urges the latch pin outwardly so that the head 40 engages the channel 16 (FIG. 9). In this position, when the assembly is lifted by the bail handle 33, the entire fuel assembly can be removed from the reactor vessel. A surface 208 acts as a stop surface for the hook member 202 when the latch pin 38 is engaged with the channel. In addition, in its disengaged position, the hook member 202 does not contact the water rod (see FIG. 10).

Figure 11:
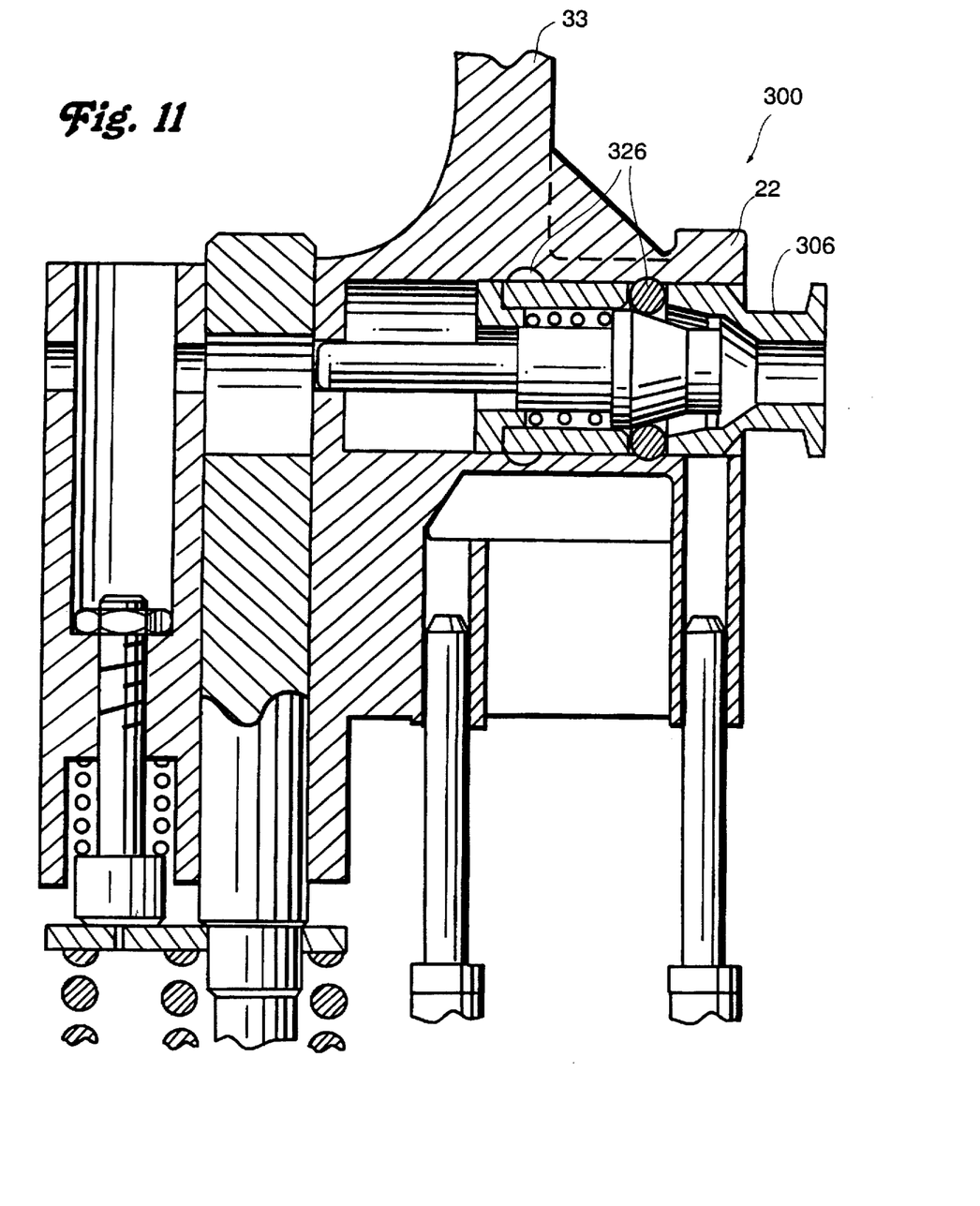
FIG. 11 illustrates another alternative latch pin assembly according to the invention.
Figure 12:
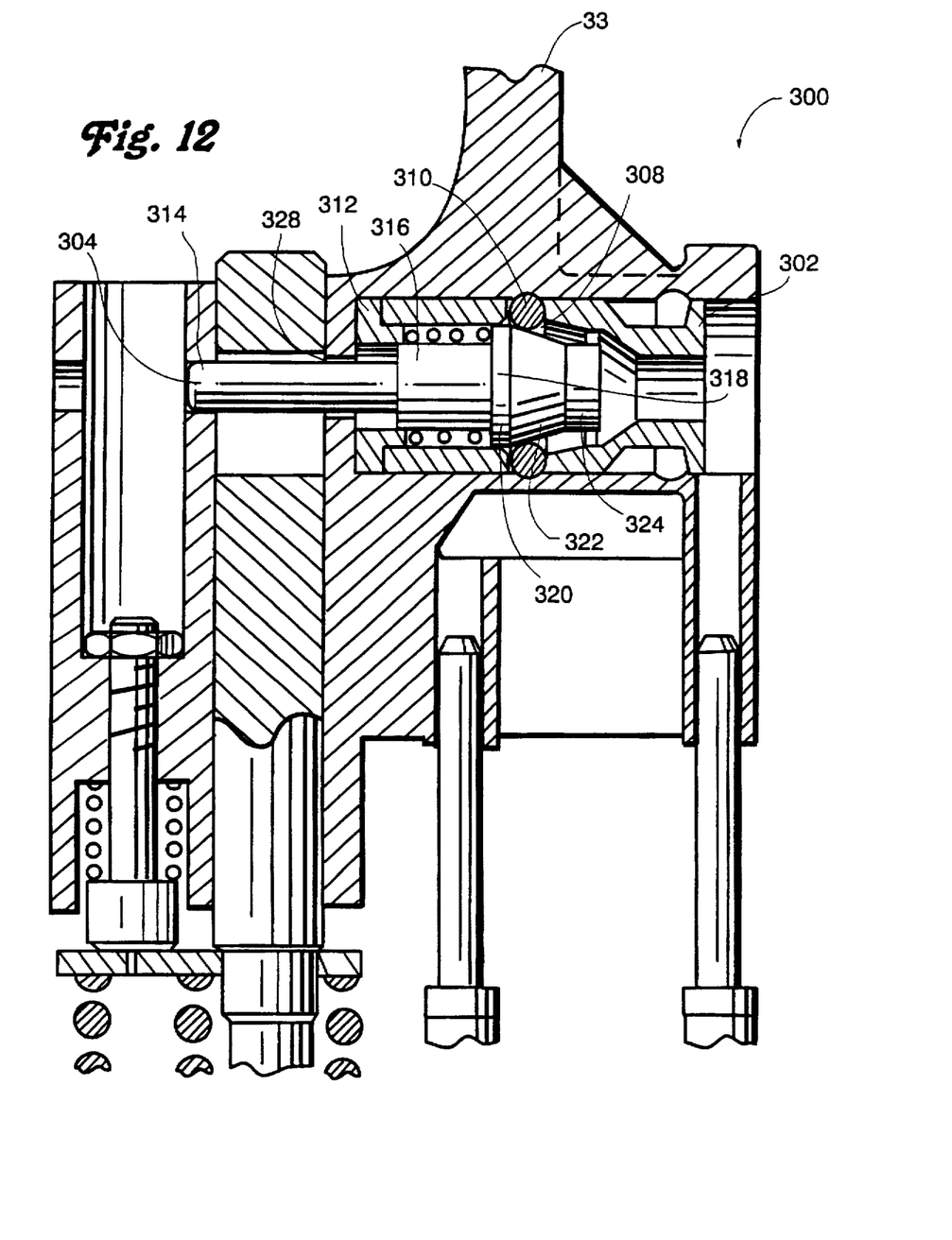
FIG. 12 illustrates the FIG. 11 latch pin assembly engaging the fuel assembly channel.

FIGS. 11-14 illustrate yet another alternative latch pin assembly 300 according to the invention. Referring to FIG. 11, the latch pin in this arrangement consists of an outer shaft 302 and an inner shaft 304. The outer shaft 302 is disposed in the channel 36 surrounding the inner shaft 304. A head portion of the outer shaft 302 includes a recessed area 306 that is adapted to receive the channel 16 of the fuel assembly. The outer shaft 302 includes a plurality of holes 308, at least three and preferably about five, evenly spaced about the periphery of the outer shaft 302. The holes 308 are configured to receive an anchoring member or ball 310. A locking ring 312 is secured to the innermost end of the outer shaft 302, preferably by threads, and provides a shelf for the spring 44.

The inner shaft 304 includes an engaging shaft portion 314, a transition shaft portion 316 and an inner shaft head 318. The inner shaft head 318 includes a first diameter section 320, a taper section 322 and a second diameter section 324 having a diameter smaller than the first diameter section 320. The taper section 322 is positioned relative to the outer shaft adjacent the holes 308 such that the balls 310 contact the taper section 322. The channel 36 includes two annular grooves 326 that are shaped to receive the balls 310.

In the position illustrated in FIG. 11, the recessed portion 306 of the outer shaft 302 is extended through an aperture in the channel 16 such that the latch pin assembly connects the upper tie plate 22 and the channel 16. Because the spring 44 urges against the inner shaft head 3 18, the taper section 322 of the inner shaft head drives the balls 310 outwardly into engagement with the grooves 326. As a result, the latch pin assembly 300 is positively secured in the channel engagement position.

To move the latch pin assembly so that it disengages from the channel and engages the coolant rod, an external tool displaces the inner shaft 304 inwardly against the force of the spring 44. As a result, the balls 310 are released from their positive engagement in the grooves 326 by virtue of the relative movement of the taper section 322. The outer shaft 302 is then driven inwardly by the external tool until the balls 310 are received in the innermost one of the grooves 326. In this configuration, illustrated in FIG. 12, the inner shaft 304 is driven through the aperture 328 in the coolant rod 14, thereby engaging the coolant rod 14. Thus, if the assembly is lifted with the bail handle 33, the fuel bundle can be removed from the reactor vessel without the channel.

Figure 13:
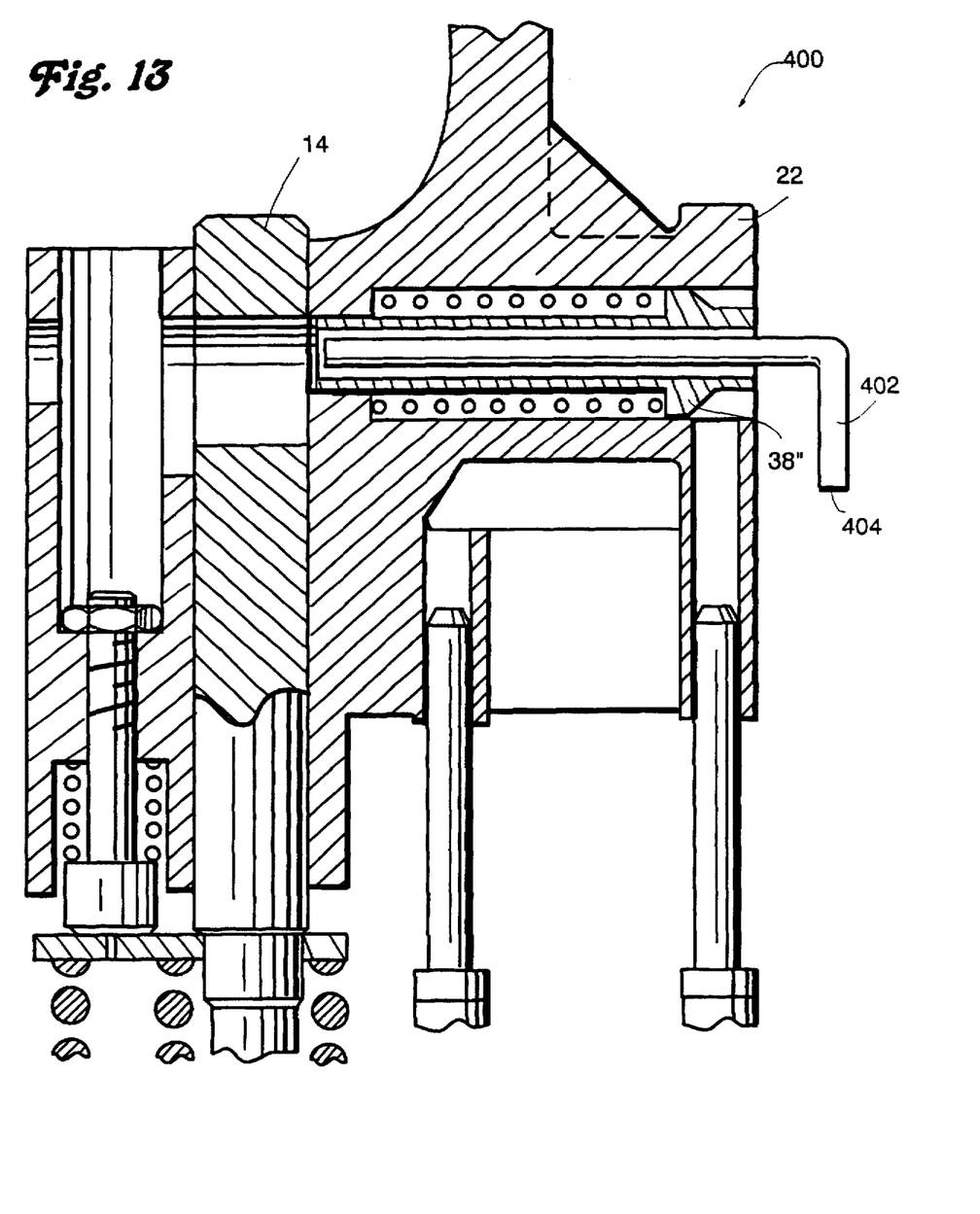
FIG. 13 illustrates still another alternative latch assembly according to the invention.

FIG. 13 illustrates still another alternative latch pin assembly 400 according to the invention. In this configuration, a modified latch pin 38" is hollow for receiving a tool 402. The tool 402 is movable within the latch pin 38" between a fuel assembly channel engaging position, as illustrated in FIG. 13, and a coolant rod engaging position. The tool 402 may be provided with a handle 404 that is remotely operable. In operation, an operator displaces the tool 402 inwardly to engage the coolant rod 14. The tool is of a length such that it simultaneously engages the fuel assembly channel 16 and the coolant rod 14 or only engages the fuel assembly channel 16. The tool may be configured such that it is capable of engaging the coolant rod after the bundle is removed from the channel. The tool 402 preferably includes structure to lock it in place inside the latch pin 38".

The components of the latch pin assemblies 100, 200, 300, 400 are preferably formed of Inconel X-750, and the shaped members (e.g., head 40, latch pin 38', inner shaft 304) are preferably machined out of bar stock. Of course, those of ordinary skill in the art may contemplate other materials and methods of forming the components, and the invention is not meant to be limited to the structure that is illustrated and described.

Figure 14:
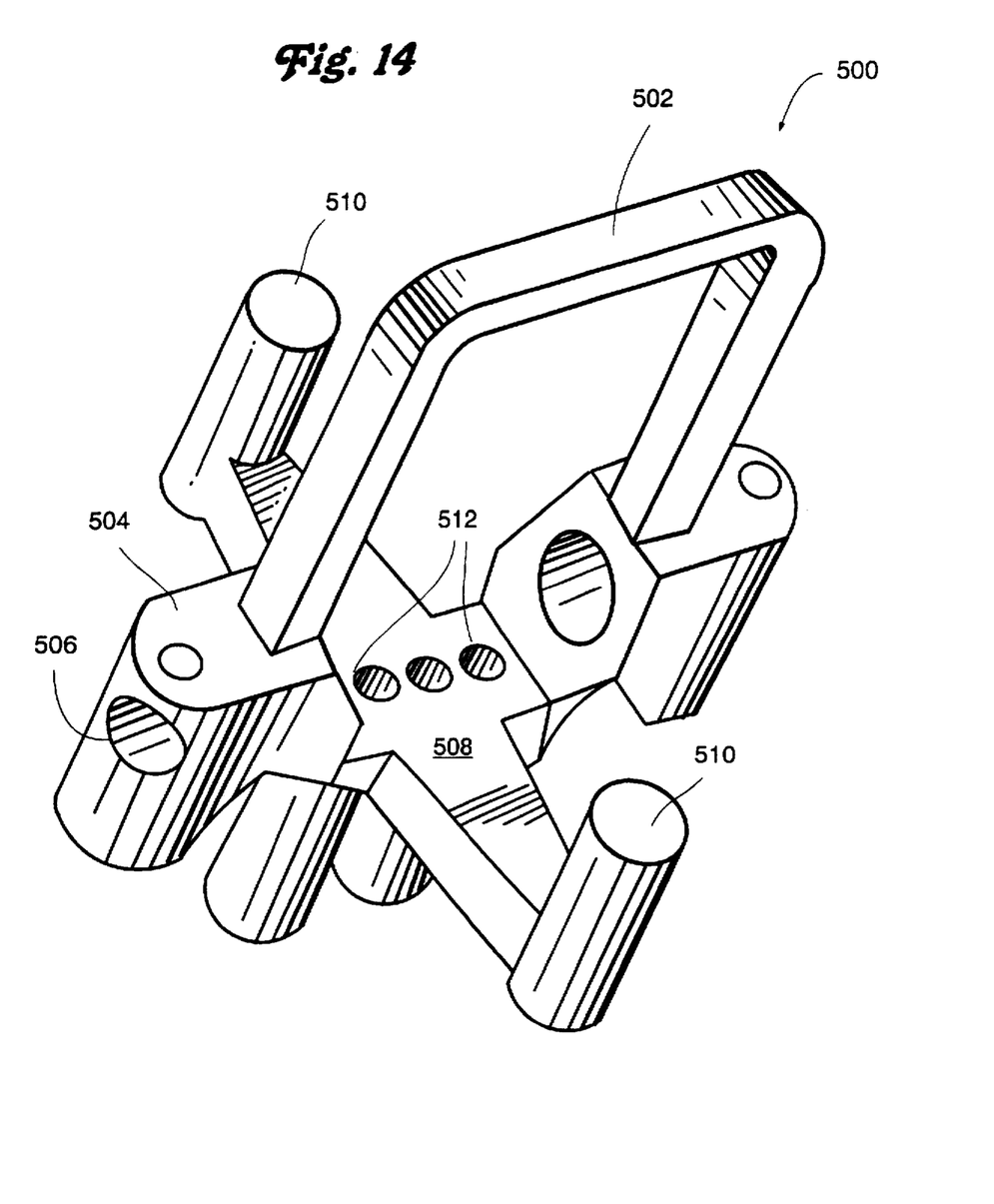
FIG. 14 is a perspective view of an alternative handle assembly according to the invention.

FIG. 14 is a perspective view of an alternative handle assembly according to the invention. With this handle assembly, it is possible to incorporate the latch pin assemblies of the invention into a fuel assembly that does not include an upper tie plate grid that receives the fuel rods. An extra spacer 18 (see FIG. 1) may be provided in the vicinity of the top of the assembly or the spacers 18 may be spaced farther apart along the fuel assembly.

The handle assembly 500 includes a bail handle 502 integral with a pair of boss members 504 having channels 506 therein. A cross member 508 having a pair of outriggers 510 is configured such that it is substantially perpendicular to the bail handle 502. As illustrated in FIG. 14, the central plane of the handle assembly 500 is disposed below the plane defined by the longitudinal axis of the channels 506. The coolant rods 14 extend upward through the holes 512 in the central plane. The latch pin assemblies of the present invention are easily incorporated into the structure of the handle assembly 500.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A latch pin assembly for a tie plate in a boiling water nuclear reactor including a fuel assembly channel surrounding a plurality of fuel rods and at least one coolant rod, the latch pin assembly comprising:
   a latch pin selectively engageable with the fuel assembly channel and the coolant rod; and
   an anchoring assembly cooperating with said latch pin, said anchoring assembly anchoring said latch pin in a selected position such that the latch pin engages at least one of the fuel assembly channel and the coolant rod.

2. A latch pin assembly according to claim 1, wherein said latch pin is alternatively engageable with the fuel assembly channel and the coolant rod.

3. A latch pin assembly according to claim 1, wherein said latch pin is simultaneously engageable with the fuel assembly channel and the coolant rod.

4. A latch pin assembly according to claim 1, wherein said tie plate includes a latch pin channel, and wherein said latch pin is movably disposed in said latch pin channel.

5. A latch pin assembly according to claim 4, wherein said latch pin comprises a head delimiting an outer end of said latch pin channel, the assembly further comprising a spring disposed between said head and an inner end of said latch pin channel, said spring urging said latch pin toward a position in engagement with said fuel assembly channel.

6. A latch pin assembly according to claim 5, wherein said anchoring assembly comprises:
   at least one annular groove formed in said latch pin channel; and
   an anchoring pin extending through said head and radially outwardly from diametrically opposite sides of said head, said anchoring pin being shaped to be received in said at least one annular groove.

7. A latch pin assembly according to claim 6, said anchoring assembly comprising two annular grooves formed in said latch pin channel, one of said two annular grooves corresponding to a first latch pin position where said latch pin is engaged with said coolant rod, and the other of said two annular grooves corresponding to a second latch pin position where said latch pin is disengaged from said fuel assembly channel and from said coolant rod.

8. A latch pin assembly according to claim 7, wherein said latch pin is configured to be movable to a third latch pin position where said latch pin is engaged with said fuel assembly channel and where said anchoring pin is not received in either of said two annular grooves.

9. A latch pin assembly according to claim 5, wherein said anchoring assembly comprises a hook disposed at an end of said latch pin opposite from said head, wherein said hook is selectively engageable with the coolant rod.

10. A latch pin assembly according to claim 9, wherein said latch pin comprises a longitudinal axis, said hook being disposed offset from said longitudinal axis.

11. A latch pin assembly according to claim 10, wherein said latch pin is rotatably disposed in said latch pin channel for rotation about said longitudinal axis between an engaged position where said hook is engaged with said coolant rod and a disengaged position where said hook is disengaged with said coolant rod.

12. A latch pin assembly according to claim 11, wherein said latch pin is extendible through an aperture through said inner end of said latch pin channel, and wherein said hook is fixed to said end opposite from said head extended through said aperture, said anchoring assembly further comprising a stop surface, wherein in said disengaged position, said hook abuts said stop surface.

13. A latch pin assembly according to claim 4, wherein said latch pin comprises an inner shaft movably disposed in said latch pin channel and an outer shaft surrounding said inner shaft and movably disposed in said latch pin channel, said inner shaft being movable relative to said outer shaft.

14. A latch pin assembly according to claim 13, wherein said anchoring assembly comprises:
   at least one annular groove formed in said latch pin channel;
   an aperture formed in said outer shaft; and
   an anchoring member disposed in said aperture and engageable with said at least one annular groove and said inner shaft.

15. A latch pin assembly according to claim 14, wherein said anchoring member is a ball, and wherein said anchoring assembly comprises two annular grooves formed in said latch pin channel, one of said two annular grooves corresponding to a first latch pin position where said latch pin is engaged with said coolant rod, and the other of said two annular grooves corresponding to a second latch pin position where said latch pin is engaged with said fuel assembly channel.

16. A latch pin assembly according to claim 14, wherein said inner shaft comprises an engaging shaft portion engageable with the coolant rod, a transition shaft portion and an inner shaft head, said inner shaft head comprising a first diameter section, a tapering diameter section and a second diameter section, smaller than said first diameter section, said anchoring member engaging said inner shaft at said tapering diameter section of said inner shaft head.

17. A latch pin assembly according to claim 16, wherein said latch pin further comprises a locking ring secured to an inside end of said outer shaft and defining a shelf inside said outer shaft, the latch pin assembly further comprising a spring disposed between said shelf and said first diameter section of said inner shaft head, said spring urging said latch pin toward a position in engagement with said fuel assembly channel.

18. A latch pin according to claim 13, wherein said outer shaft comprises an outer shaft head engageable with the fuel assembly channel, said outer shaft head having a first innermost diameter, a second intermediate diameter smaller than said first innermost diameter, and a third outermost diameter larger than said second intermediate diameter.

19. A latch pin assembly according to claim 1, wherein said latch pin is formed of Inconel X-750.

20. A fuel assembly comprising:
   a plurality of fuel rods;
   at least one coolant rod;
   a fuel assembly channel surrounding said plurality of fuel rods and said coolant rod;
   an upper tie plate disposed inside said fuel assembly channel and laterally supporting said fuel rods and said coolant rod; and
   a latch pin assembly selectively engageable with the fuel assembly channel and the coolant rod.

21. A fuel assembly according to claim 20, wherein said latch pin assembly comprises a latch pin, and wherein said coolant rod comprises an engaging aperture configured to receive said latch pin.

22. A fuel assembly according to claim 21, wherein said latch pin assembly further comprises an anchoring assembly cooperating with said latch pin, said anchoring assembly anchoring said latch pin in a selected position such that the latch pin engages at least one of the fuel assembly channel and the coolant rod.

23. A fuel assembly according to claim 22, wherein said latch pin is alternatively engageable with the fuel assembly channel and the coolant rod.

24. A fuel assembly according to claim 22, wherein said latch pin is simultaneously engageable with the fuel assembly channel and the coolant rod.

25. A fuel assembly according to claim 22, wherein said tie plate includes a latch pin channel, and wherein said latch pin is movably disposed in said latch pin channel.

26. A fuel assembly according to claim 25, wherein said latch pin comprises a head delimiting an outer end of said latch pin channel, the latch pin assembly further comprising a spring disposed between said head and an inner end of said latch pin channel, said spring urging said latch pin toward a position in engagement with said fuel assembly channel.

27. A method of lifting a fuel assembly in a boiling water nuclear reactor, the fuel assembly including a plurality of fuel rods, at least one coolant rod, a fuel assembly channel surrounding the plurality of fuel rods and the coolant rod, an upper tie plate disposed inside the fuel assembly channel and laterally supporting the fuel rods and the coolant rod, and a latch pin assembly selectively engageable with the fuel assembly channel and the coolant rod, the method comprising:

enabling the latch pin assembly to selectively engage the fuel assembly channel and the coolant rod, anchoring the latch pin in a selected position such that the latch pin engages at least one of the fuel assembly channel and the coolant rod; and lifting the fuel assembly through the upper tie plate.

28. A fuel assembly comprising:

a plurality of fuel rods;

at least one coolant rod;

a fuel assembly channel surrounding said plurality of fuel rods and said coolant rod;

a handle assembly including at least one aperture adapted to receive said at least one coolant rod; and a latch pin assembly supported in said handle assembly and selectively engageable with the fuel assembly channel and the coolant rod.

* * * * *